United States Patent
Heubi

(10) Patent No.: US 12,093,064 B2
(45) Date of Patent: Sep. 17, 2024

(54) WIDE INPUT VOLTAGE RANGE LOW-POWER CHARGE PUMP BASED LDO

(71) Applicant: SEMICONDUCTOR COMPONENTS INDUSTRIES, LLC, Phoenix, AZ (US)

(72) Inventor: Alexander Heubi, La Chaux-de-Fonds (CH)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 225 days.

(21) Appl. No.: 17/807,170

(22) Filed: Jun. 16, 2022

(65) Prior Publication Data
US 2023/0054955 A1    Feb. 23, 2023

Related U.S. Application Data

(60) Provisional application No. 63/260,462, filed on Aug. 20, 2021.

(51) Int. Cl.
G05F 1/56    (2006.01)
G05F 3/26    (2006.01)
H02M 3/07    (2006.01)

(52) U.S. Cl.
CPC ............. *G05F 1/56* (2013.01); *G05F 3/262* (2013.01); *H02M 3/07* (2013.01)

(58) Field of Classification Search
CPC ............. G05F 1/56; G05F 3/262; H02M 3/07
See application file for complete search history.

(56) References Cited

U.S. PATENT DOCUMENTS

| | | | |
|---|---|---|---|
| 9,582,015 B2 * | 2/2017 | Taniguchi | G05F 1/575 |
| 10,594,210 B1 * | 3/2020 | Mercer | H03K 17/063 |
| 2008/0158915 A1 * | 7/2008 | Williams | H02M 3/07 363/21.06 |
| 2009/0059630 A1 * | 3/2009 | Williams | H02M 3/1588 363/60 |
| 2011/0156670 A1 | 6/2011 | Tadeparthy et al. | |
| 2012/0262137 A1 | 10/2012 | Arigliano et al. | |
| 2015/0220096 A1 | 8/2015 | Luff | |

* cited by examiner

*Primary Examiner* — Kyle J Moody
(74) *Attorney, Agent, or Firm* — Polansky & Associates, P.L.L.C.; Paul J. Polansky; Nathan H. Calvert

(57) ABSTRACT

A low-dropout linear regulator regulates a supply voltage and includes a voltage-to-frequency circuit producing a pulse chain with a frequency based on an error voltage. A charge pump circuit receives the pulse chain and switching one or more charge pumps based on the pulse chain. A current mirror circuit is connected to the charge pump circuit and includes a first diode-connected metal-oxide semiconductor (MOS) transistor, and a second MOS transistor having a first terminal connected to the supply voltage, a second terminal providing an output, and a gate connected to the gate of the first MOS transistor. The output is fed back to the voltage-to-frequency circuit.

19 Claims, 2 Drawing Sheets

WIDE INPUT VOLTAGE RANGE LOW-POWER CHARGE PUMP BASED LDO

CROSS-REFERENCE TO RELATED APPLICATIONS

This application claims the benefit of U.S. Provisional Application 63/260,462, filed Aug. 20, 2021, the entire contents of which are incorporated herein by reference.

FIELD OF THE INVENTION

The disclosure relates to voltage regulators for integrated circuits, and particularly to low-dropout regulators.

BACKGROUND

Low-Dropout (LDO) regulators are linear voltage regulators commonly used to supply voltages to components in electronic devices, particularly to devices using battery power. Generally, LDO regulators have a low input to output differential voltage, the "dropout". LDO regulators are generally required to have high efficiency and generate little heat.

As operating voltages for digital circuits get lower with improved technology nodes, the output voltage of an LDO can also be lower. However, the supply voltages, typically a battery voltage, may be much higher than the output voltage. This creates some difficulties with the transistors used in the LDO regulator. The voltage difference between the supply and the output may be too large for the threshold voltages of the transistors. Furthermore, the low output voltage may require driving the gate of transistors with a negative voltage when the input voltage becomes too low, such as when a battery has been significantly discharged.

One known approach to solving these problems is to use charge pumps switched at a constant frequency to bias the drain of a power n-type metal-oxide semiconductor (NMOS) transistor at the output. However, this approach requires an oscillator to drive the charge pump, and is not very energy efficient. Another existing LDO regulator use a current mirror drive by an error amplifier. However, this circuit requires biasing of the output transistors, is also not very energy efficient, and is not able to operate at low supply voltages.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

Figure 1:
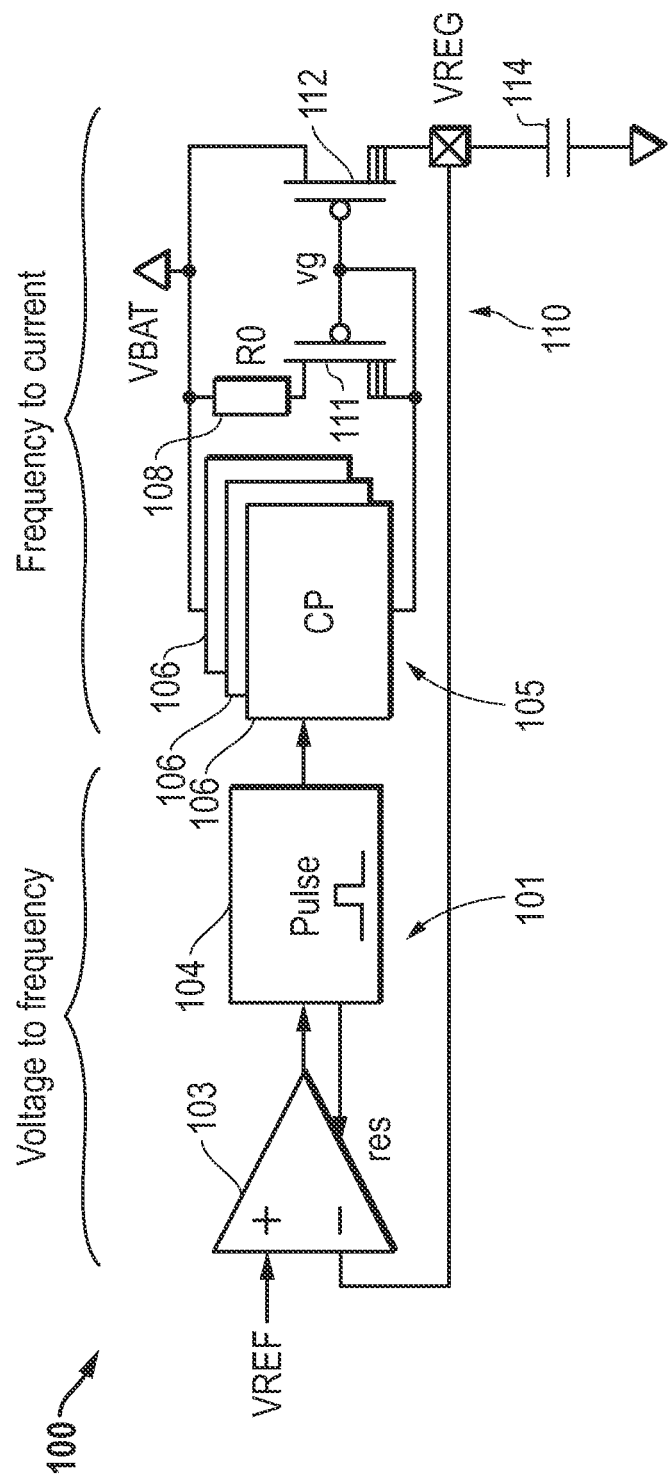
FIG. 1 illustrates in mixed block diagram and circuit diagram form a driver circuit according to some embodiments.

FIG. 1 illustrates in mixed block diagram and circuit diagram form a low-dropout (LDO) linear regulator 100 according to some embodiments. LDO regulator 100 includes a voltage-to-frequency circuit 101, a charge pump circuit 105, and a current mirror circuit 110, and an output capacitor 114. Generally, LDO regulator 100 is embodied on a host integrated circuit and regulates a battery voltage labelled "VBAT" to supply a load with an output voltage labelled "VREG".

Voltage-to-frequency circuit 101 has a first input receiving a reference voltage "VREF", a second input receiving the voltage VREG, and an output providing a pulse chain at a frequency related to a voltage difference between the first and second inputs. Voltage-to-frequency circuit 101 includes a comparator 103 and a pulse generator 104. Comparator 103 (also known as an "error amplifier") has first and second inputs connected voltage-to-frequency circuit inputs, a reset input, and an output. Pulse generator 104 has an input connected to the output of the comparator, and an output providing a pulse chain, the output also being connected to the reset input of comparator 103.

Charge pump circuit 105 has an input receiving the pulse chain from pulse generator 103, and an output. Charge pump circuit 105 includes multiple charge pumps 106 connected in parallel. Charge pump circuit 105 switches the charge pumps based on the pulse chain to provide a charge pump output voltage at vg. In other implementations, only a single charge pump may be used. Charge pumps 106 are further described below with respect to FIGS. 2 and 3.

Current mirror circuit 110 has a first input connected to the output of charge pump circuit 105, a second input receiving the battery voltage VBAT, and an output. Current mirror circuit 110 includes a first metal-oxide semiconductor (MOS) transistor 111, a resistor 108 having a value "R0", and a second MOS transistor 112. MOS transistor 111 has a first current electrode coupled to the battery voltage VBAT through resistor 108, a second current electrode connected to the charge pump output voltage at node vg, and a gate also connected to the second terminal. MOS transistor 112 has a first current electrode receiving the battery voltage VBAT, a second current electrode connected to a positive terminal of output capacitor 114, and a gate connected to the gate of the MOS transistor 111. The second terminal of MOS transistor 112 is also connected to the second input of the voltage-to-frequency circuit 101. MOS transistors 111 and 112 are p-type MOS transistors, and are preferably constructed as laterally-diffused metal-oxide semiconductor (LDMOS) transistors.

In operation, LDO 100 drives charge pumps 105 with a chain of pulses at a frequency related to an error voltage VREF-VREG. These pulses drive charge pumps 106 which transform the frequency to an output voltage and current injected to the node "vg", creating a frequency-to-current conversion to drive current mirror 110. Charge pumps 106 are individually activated, as further described with respect to FIG. 3. The number of activated charge pumps 106 allows the frequency to current conversion gain to be adjusted. This adjustment is done dynamically during the operation of LDO 100 by gating the clock of unused ones of charge pumps 106.

The current at node vg is amplified by current mirror circuit 110 to provide the current to the load of output voltage VREG. Output capacitor 114 smooths variations of output voltage VREG. Resistor 108 boosts the gain of current mirror circuit 110 for higher efficiency, particularly a higher output current to drive current ratio.

In this implementation, charge pumps 106 are constructed with a circuit (FIG. 2) that can also be used to voltage-translate digital signals, but used herein to transform the input frequency to a current on vg. Other known charge pump circuits are used in other implementations. If no pulse chain is driving charge pump circuit 105, current mirror 110 will slowly discharge to "vg" node to VBAT.

The pull-down current at node vg is dependent on the pulse chain frequency and on the voltage VBAT-vg divided by the pulse chain voltage amplitude. In absence of load on node vg, the voltage VBAT-vg voltage will tend to move toward the pulse chain voltage amplitude, effectively shifting the input voltage to VBAT-input voltage. The absolute voltage at node vg can therefore by negative.

The resulting LDO regulator is able to provide an output voltage VREG in the order of 0.9V from an input voltage ranging from 0.9V to 5V. Using an LDMOS for the power device (MOS transistor 112) provides the ability to sustain these rated voltages. The high threshold voltage of the LDMOS transistor is such that the gate voltage might become negative for low input voltages. Charge pump circuit 105 solves the problem of negative gate voltages while meeting the other requirements for energy efficiency and scalability. This design makes it possible to achieve a very wide output current range (from the order of nano-amps (nA) to 10 s of milli-amps (mA)) from a wide input voltage range with minimal quiescent current.

Figure 2:
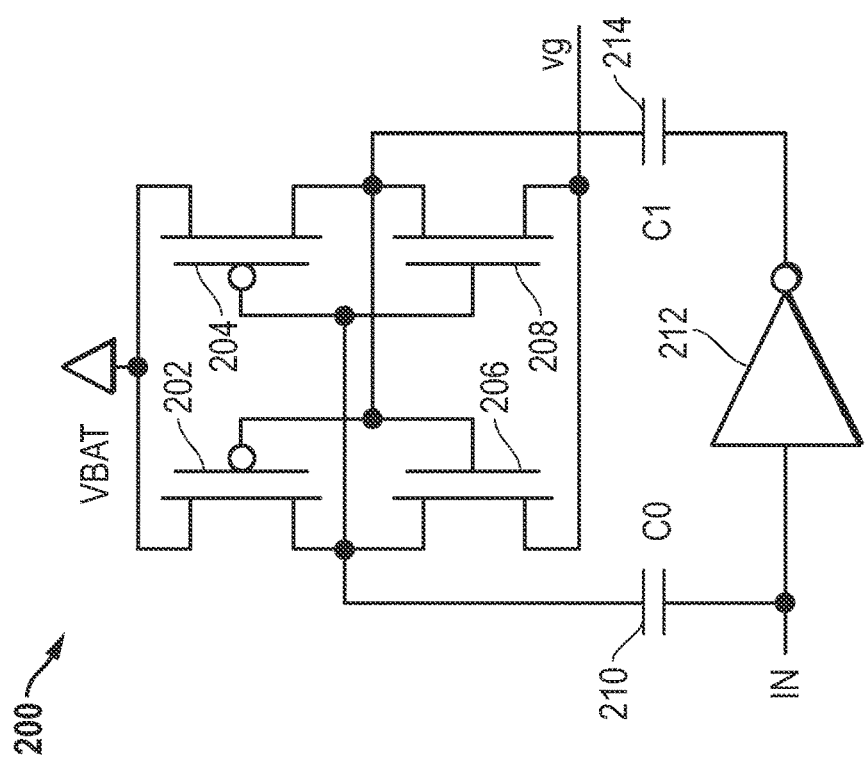
FIG. 2 illustrates in circuit diagram form a circuit according to some embodiments.

FIG. 2 illustrates in circuit diagram form a charge pump circuit 200 according to some embodiments. Charge pump 200 is suitable for use as charge pumps 106 of FIG. 1, and in a similar function in other embodiments. Charge pump 200 includes an input labelled "IN" receiving the pulse chain from voltage-to-frequency circuit 101, an input receiving the battery voltage VBAT, and an output labelled "vg". Charge pump 200 includes two PMOS transistor 202 and 204, two NMOS transistor 206 and 208, two capacitors 210 and 214, and an inverter 212.

PMOS transistors 202 and 204 each have a source terminal connected to the VBAT input. PMOS transistor 202 has a drain connected to first terminal of capacitor 210 and a gate connected to a first terminal of capacitor 214. PMOS transistor 204 has a gate connected to the first terminal of capacitor 210 and a drain connected to the first terminal of capacitor 214.

NMOS transistors 206 and 208 each have a source connected to the vg output. NMOS transistor 206 has a gate connected to the first terminal of capacitor 214, and a drain connected to the first terminal of capacitor 210. NMOS transistor 208 has a gate connected to the first terminal of capacitor 210 and a drain connected to the first terminal of capacitor 214.

Inverter 212 has an input connected to input IN, which is also connected to the second terminal of capacitor 210. The output of inverter 212 is connected to the second terminal of capacitor 214.

In operation, a driving clock such as the pulse chain of FIG. 1 is applied at the input IN, and capacitors 210 and 214 will toggle in opposite phase, alternately switching on transistors 202 and 204, then transistors 205 and 208 to pull the voltage at vg low in order to turn on MOS transistor 112 (FIG. 1).

Figure 3:
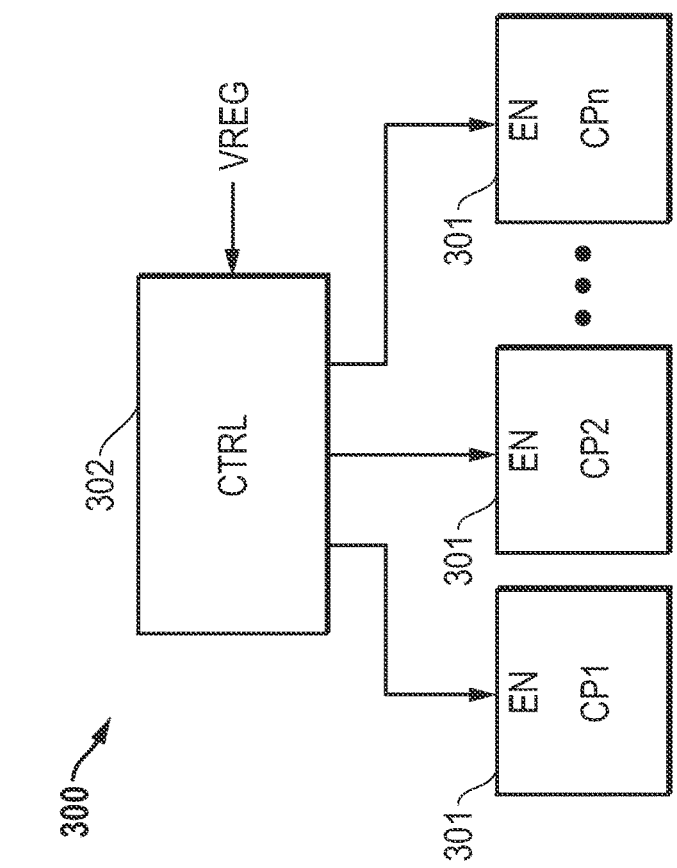
FIG. 3 illustrates in block diagram form a charge pump circuit according to some embodiments.

FIG. 3 illustrates in block diagram form a charge pump circuit 300 according to some embodiments. Charge pump circuit 300 is suitable for use as a charge pump circuit 105 in LDO 100 of FIG. 1, and other similar implementations. Charge pump circuit 300 includes a number "n" of charge pumps 301 labelled "CP1", "CP2" through "CPn", and a control circuit 302. Each charge pump 301 has an enable input labelled "EN" coupled to control circuit 301 for selectively activating and deactivating charge pumps 301 to adjust the gain of the LDO.

Control circuit 302 has a plurality of control outputs coupled to respective EN inputs of the charge pumps 301 for controlling how many charge pumps are activated during operation of the LDO. Control circuit 302 also has an input receiving the LDO output voltage VREG for monitoring the output voltage. Control circuit 302 may implement a variety of control schemes using digital logic, and generally activates more of charge pumps 301 responsive to drops of VREG below a designated value such as reference voltage VREF (FIG. 1), and de-activates charge pumps 301 responsive to increases above the designated value.

Thus, various embodiments of LDO circuits, an integrated circuit including such LDO circuits, and corresponding methods have been described. Generally, LDO 100 constructed as disclosed herein has a very wide range input voltage range, and is highly responsive in regulating both load and line (supply) variations. While a battery voltage is shown herein, LDO 100 may be used in with other voltage supplies. LDO 100 has a minimal quiescent current making this design advantages for host circuits that use a sleep mode in which circuit supplied by VREG is put to sleep. LDO 100 is also very area efficient in use of integrated circuit area. The adjustable gain provided by scaling the number of charge pumps also allows use with a wide range of load currents while maintaining all these advantages.

The above-disclosed subject matter is to be considered illustrative, and not restrictive, and the appended claims are intended to cover all such modifications, enhancements, and other embodiments that fall within the true scope of the claims. For example, particular technology node employed may vary. As another example, the digital logic employed to control the charge pump circuit herein may, of course, vary while providing the same functionality.

Thus, to the maximum extent allowed by law, the scope of the present invention is to be determined by the broadest permissible interpretation of the following claims and their equivalents, and shall not be restricted by the forgoing detailed description.

What is claimed is:

1. A low-dropout linear regulator comprising:
   a voltage-to-frequency circuit including a first input receiving a reference voltage, a second input, and an output providing a pulse chain at a frequency related to a voltage difference between the first and second inputs;
   a charge pump circuit receiving the pulse chain and switching one or more charge pumps based on the pulse chain to provide a charge pump output voltage; and
   a current mirror circuit including:
      a first metal-oxide semiconductor (MOS) transistor having a first terminal coupled to a supply voltage through a resistor, a second terminal connected to the charge pump output voltage, and a gate connected to the second terminal; and
      a second MOS transistor having a first terminal connected to the supply voltage, a second terminal providing an output connected to a positive terminal of an output capacitor and to the second input of the voltage-to-frequency circuit, and a gate connected to the gate of the first MOS transistor.

2. The low-dropout linear regulator of claim 1, wherein the voltage-to-frequency circuit comprises:

a comparator having first and second inputs connected to the first and second voltage-to-frequency circuit inputs, a reset input, and an output; and a pulse generator for providing the pulse chain, including an input connected to the output of the comparator, and an output providing the pulse chain, the output connected to the reset input of the comparator.

3. The driver circuit of claim 2, wherein:
the charge pump circuit includes a plurality of charge pumps, each including an enable input coupled to a controller for selectively activating and deactivating the charge pumps to adjust a gain of the low dropout linear regulator.

4. The low-dropout linear regulator of claim 3, further comprising:
a control circuit having a plurality of control outputs coupled to respective enable inputs of the charge pumps for controlling how many charge pumps are activated during operation of the low-dropout linear regulator.

5. The low-dropout linear regulator of claim 4, wherein:
the control circuit has an input connected to the output capacitor for monitoring the output voltage of the low-dropout linear regulator.

6. The low-dropout linear regulator of claim 1, wherein the one or more charge pumps each comprise:
an inverter having an input receiving the pulse chain and an output;
a first p-type metal oxide semiconductor (PMOS) transistor with a source connected to the supply voltage, a drain coupled to the inverter input through a first capacitor, and a gate coupled to the inverter output through a second capacitor;
a first n-type metal oxide semiconductor (NMOS) transistor with a drain connected to the drain of the first PMOS transistor, a source connected to a charge pump output, and a gate connected to the gate of the first PMOS transistor;
a second PMOS transistor with a source connected to the supply voltage, a drain coupled to the inverter output through the second capacitor, and a gate connected to the drain of the first PMOS transistor; and
a second NMOS transistor with a drain connected to the drain of the second PMOS transistor, a source connected to the charge pump output, and a gate connected to the gate of the second PMOS transistor.

7. The driver circuit of claim 1, wherein:
the first and second MOS transistors are laterally-diffused metal-oxide semiconductor (LDMOS) transistors.

8. A method of providing a low-drop out regulated voltage, comprising:
producing a pulse chain at a variable frequency related to a voltage difference between a regulated voltage and a reference voltage;
driving a charge pump circuit with the pulse chain to provide a charge pump output voltage; and
feeding the charge pump output voltage to gates of MOS transistors in a current mirror circuit including a first MOS transistor with a first terminal connected to its gate and a second terminal coupled to a supply voltage through a resistor, and a second MOS transistor coupled between the supply voltage and an output capacitor.

9. The method of claim 8, wherein producing the pulse chain further comprises:
comparing the regulated voltage and a reference voltage with a comparator;

generating a pulse based on the regulated voltage being lower than the reference voltage; and
resetting the comparator with the pulse.

10. The method of claim 8, wherein:
the charge pump circuit includes a plurality of charge pumps connected in parallel.

11. The method of claim 8, further comprising:
selectively disabling some of the plurality of charge pumps while producing the regulated voltage.

12. The method of claim 8, wherein:
the first and second MOS transistors are laterally-diffused metal-oxide semiconductor (LDMOS) transistors.

13. An integrated circuit comprising:
a low-dropout linear regulator comprising:
a voltage-to-frequency circuit including a first input receiving a reference voltage, a second input, and an output providing a pulse chain at a frequency related to a voltage difference between the first and second inputs;
a charge pump circuit receiving the pulse chain and switching one or more charge pumps based on the pulse chain to provide a charge pump output voltage; and
a current mirror circuit including:
a first metal-oxide semiconductor (MOS) transistor having a first terminal coupled to a supply voltage through a resistor, a second terminal connected to the charge pump output voltage, and a gate connected to the second terminal; and
a second MOS transistor having a first terminal connected to the supply voltage, a second terminal providing an output connected to a positive terminal of an output capacitor and to the second input of the voltage-to-frequency circuit, and a gate connected to the gate of the first LDMOS transistor.

14. The integrated circuit of claim 13, wherein the voltage-to-frequency circuit comprises:
a comparator having first and second inputs connected voltage-to-frequency circuit inputs, a reset input, and an output; and
a pulse generator for providing the pulse chain, including an input connected to the output of the comparator, and an output providing the pulse chain, the output connected to the reset input of the comparator.

15. The integrated circuit of claim 14, wherein:
the charge pump circuit includes a plurality of charge pumps, each including an enable input coupled to a controller for selectively activating and deactivating the charge pumps to adjust a gain of the low dropout linear regulator.

16. The integrated circuit of claim 15, further comprising:
a control circuit having a plurality of control outputs coupled to respective enable inputs of the charge pumps for controlling how many charge pumps are activated during operation of the low-dropout linear regulator.

17. The integrated circuit of claim 16, wherein:
the control circuit has an input connected to the output capacitor for monitoring the output voltage of the low-dropout linear regulator.

18. The integrated circuit of claim 13, wherein the one or more charge pumps each comprise:
an inverter having an input receiving the pulse chain and an output;
a first p-type metal oxide semiconductor (PMOS) transistor with a source connected to the supply voltage, a drain coupled to the inverter input through a first capacitor, and a gate coupled to the inverter output through a second capacitor;

a first n-type metal oxide semiconductor (NMOS) transistor with a drain connected to the drain of the first PMOS transistor, a source connected to the charge pump output, and a gate connected to the gate of the first PMOS transistor;

a second PMOS transistor with a source connected to the supply voltage, a drain coupled to the inverter output through the second capacitor, and a gate connected to the drain of the first PMOS transistor; and a second NMOS transistor with a drain connected to the drain of the second PMOS transistor, a source connected to the charge pump output, and a gate connected to the gate of the second PMOS transistor.

19. The integrated circuit of claim 13, wherein:

the first and second MOS transistors are laterally-diffused metal-oxide semiconductor (LDMOS) transistors.

* * * * *